（12）United States Patent
Tai

(10) Patent No.: US 9,534,611 B2
(45) Date of Patent: Jan. 3, 2017

(54) FAN DRIVING CIRCUIT

(71) Applicant: HON HAI PRECISION INDUSTRY CO., LTD., New Taipei (TW)

(72) Inventor: Ming-Tse Tai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 851 days.

(21) Appl. No.: 13/895,377

(22) Filed: May 16, 2013

(65) Prior Publication Data

US 2014/0271236 A1 Sep. 18, 2014

(30) Foreign Application Priority Data

Mar. 18, 2013 (TW) .............................. 102109395 A

(51) Int. Cl.
| | | |
|---|---|---|
| *F04D 25/00* | (2006.01) | |
| *F04D 25/16* | (2006.01) | |
| *F04D 25/06* | (2006.01) | |
| *F04D 13/06* | (2006.01) | |
| *F04D 27/00* | (2006.01) | |
| *H02P 7/00* | (2016.01) | |

(52) U.S. Cl.
CPC ......... *F04D 25/166* (2013.01); *F04D 13/0693* (2013.01); *F04D 25/0693* (2013.01); *F04D 25/16* (2013.01); *F04D 27/00* (2013.01); *F04D 27/004* (2013.01); *H02P 7/00* (2013.01)

(58) Field of Classification Search
CPC .... F04D 25/16; F04D 25/166; F04D 25/0693; F04D 13/0693; F04D 27/00
See application file for complete search history.

(56) References Cited

U.S. PATENT DOCUMENTS

| | | | | |
|---|---|---|---|---|
| 5,612,599 A | * | 3/1997 | Itami ....................... | H02P 6/08 318/400.27 |
| 6,392,370 B1 | * | 5/2002 | Bedini ................... | H02K 21/24 310/113 |
| 6,577,090 B2 | * | 6/2003 | Brown ..................... | H02P 9/00 318/434 |

(Continued)

FOREIGN PATENT DOCUMENTS

| | | |
|---|---|---|
| CN | 1625041 A | 6/2005 |
| CN | 101408186 A | 4/2009 |

*Primary Examiner* — Charles Freay
*Assistant Examiner* — Christopher Bobish
(74) *Attorney, Agent, or Firm* — Zhigang Ma

(57) ABSTRACT

A fan driving circuit drives a first fan and a second fan which are connected in parallel and connected to an anode of a direct current power. The fan driving circuit includes a pulse width modulation signal generation module, a phase lock and delay module, a first pulse output comparator and a first capacitor. The width modulation signal generation module is connected between an external power and the first fan. The phase lock and delayed module is electrically connected to the pulse width modulation signal generation module. The first capacitor is connected between the DC and the ground. The first fan is supplied as normal by a PWM power supply, the second fan is powered by "shadow" and out-of-phase pulses taken from an inductor in the first fan and stored in the capacitor, to achieve a "two-for-one" power supply aspect, which saves power and reduces operational noise.

8 Claims, 3 Drawing Sheets

(56) References Cited

U.S. PATENT DOCUMENTS

| | | | | |
|---|---|---|---|---|
| 6,774,587 B2* | 8/2004 | Makaran | ............... | H02P 7/29 |
| | | | | 318/34 |
| 7,173,467 B2* | 2/2007 | Liu | ............... | H02M 7/53871 |
| | | | | 327/242 |
| 7,826,722 B2* | 11/2010 | Lin | ............ | H02P 7/2913 |
| | | | | 318/400.01 |
| 8,581,534 B2* | 11/2013 | Tsai | ............ | H02P 7/29 |
| | | | | 318/400.06 |
| 8,829,842 B2* | 9/2014 | Pangella | ............ | H02P 7/29 |
| | | | | 318/494 |
| 8,860,351 B2* | 10/2014 | Chiu | ............ | H02P 7/06 |
| | | | | 318/456 |
| 2004/0027105 A1 | 2/2004 | Nakamura et al. | | |
| 2012/0057385 A1* | 3/2012 | Hsu | ............ | H02M 7/5395 |
| | | | | 363/131 |
| 2014/0265594 A1* | 9/2014 | van Ruymbeke | ....... | H02J 7/345 |
| | | | | 307/66 |

* cited by examiner

FAN DRIVING CIRCUIT

BACKGROUND

1. Technical Field

The disclosure relates to fan driving circuits, and particularly to a fan driving circuit which reduces energy consumption.

2. Description of Related Art

A typical fan continuously consumes electrical energy to drive the fan to rotate. Thus, the typical fan driving circuit consumes much electrical energy. In addition, the parts of the driving circuit are prone to fatigue and accordingly have a short working lifetime.

DETAILED DESCRIPTION

Figure 1:
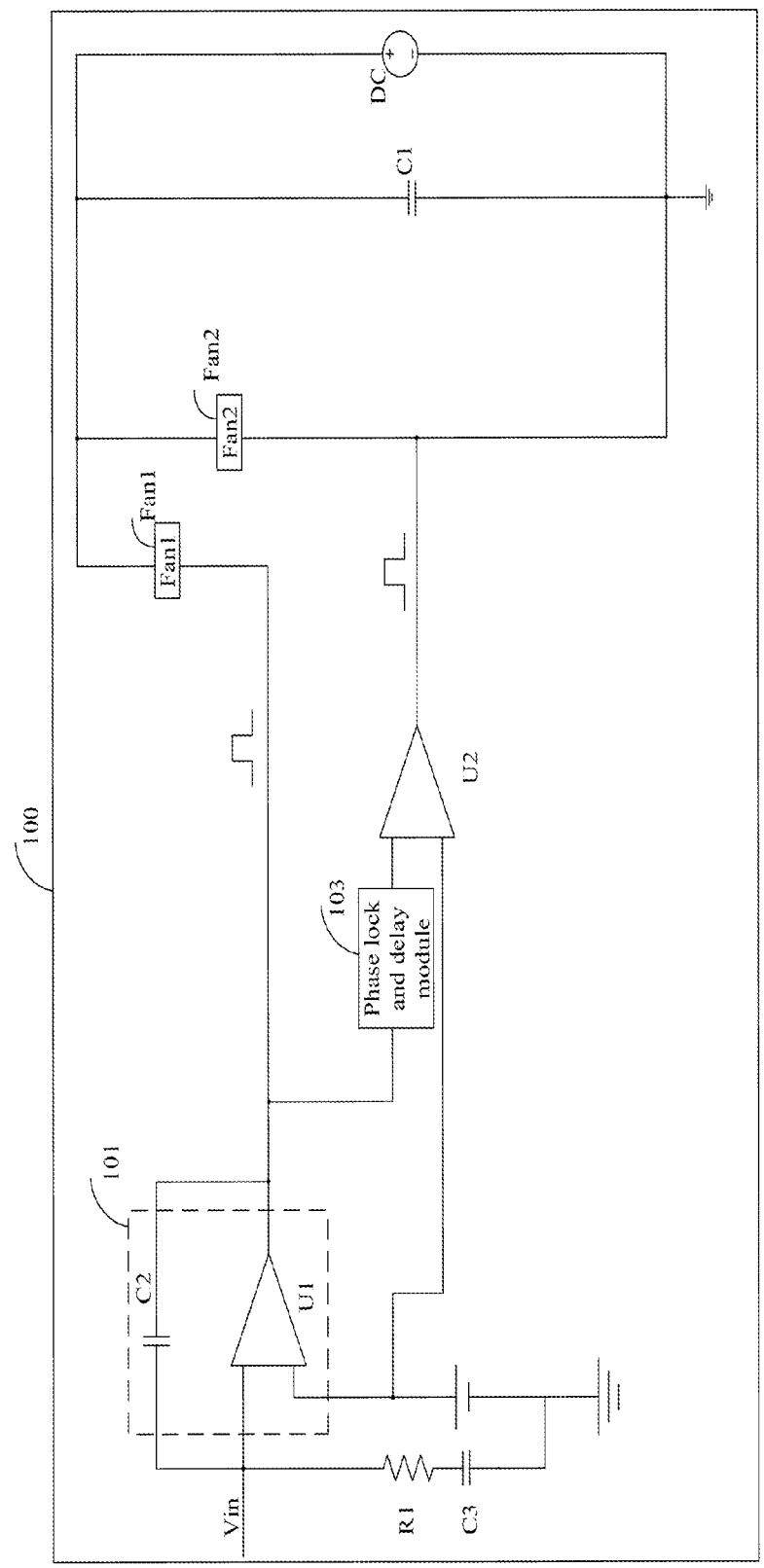
FIG. 1 is a circuit diagram of a fan driving circuit of a first embodiment of the present disclosure.

FIG. 1 is a circuit diagram of a fan driving circuit 100 of an embodiment of the present disclosure.

In one embodiment, the fan driving circuit 100 includes a first fan Fan1 and a second fan Fan2. The first fan Fan1 and the second fan Fan2 are electrically connected to an anode of a direct current (DC) power source. The fan driving circuit 100 includes a pulse width modulation signal generation module 101, a phase lock and delay module 103, a first pulse output comparator U2 and a first capacitor C1. The fan driving circuit 100 uses an inductor of the first fan Fan1 to generate Lenz current when the pulse width modulation signal generation module 101 is in the non-working stage of the cycle. The Lenz current is stored in the first capacitor C1 and drives the second fan Fan2.

One terminal of the pulse width modulation signal generation module 101 is electrically connected to an external power source, and another terminal of the pulse width modulation signal generation module 101 is electrically connected to the first fan Fan1. The pulse width modulation signal generation module 101 generates pulses to drive the first fan Fan1 and (indirectly) the second fan Fan2.

In one embodiment, the pulse width modulation signal generation module 101 includes a second capacitor C2 and a voltage comparator U1. The voltage comparator U1 includes a first input, a second input and an output. The first input of the voltage comparator U1 is electrically connected to the external power, the second input of the voltage comparator U1 is a reference voltage terminal, and the output of the voltage comparator U1 is electrically connected to the first fan Fan1. When a voltage of the external power source is greater than a reference voltage of the voltage comparator, the output of the voltage comparator U1 outputs high level signals to the pulse width modulation signal generation module 101 to cause the pulse width modulation signal generation module 101 to be in the working stage of the cycle and output positive waves. When the voltage of the external power source is less than the reference voltage of the voltage comparator U1, the output of the voltage comparator U1 outputs low level signals to the pulse width modulation signal generation module 101 to put the pulse width modulation signal generation module 103 in the non-working stage of the cycle. The phase lock and delay module 103 is electrically connected to the pulse width modulation signal generation module 101. The phase lock and delay module 103 sends pulse width modulation signals to the pulse width modulation signal generation module 101 to make the pulse width modulation signal generation module 101 generate corresponding, but phase-retarded, pulses.

The phase lock and delay module 103 generates pulse width modulation signals with a phase difference of 180 degrees to the pulse width modulation signal generation module 101 to make the pulse width modulation signal generation module 101 generate different-phase waves to drive the second fan Fan2.

The first phase output comparator U2 includes a first input, a second input and an output. The first input of the first phase output comparator U2 is electrically connected to the phase lock and delay module 103 to receive the pulse width modulation signal generated by the phase lock and delay module 103. The second input of the first phase output comparator U2 inputs the reference voltage. The output of the first phase output comparator U2 is electrically connected between the second fan Fan2 and ground. The first phase output comparator U2 outputs pulses to drive the second fan Fan2 according to the pulse width modulation signal generation module 101.

The first capacitor C1 is electrically connected between an anode of the direct current DC and ground. The fan driving circuit 100 uses the inductor of the first fan Fan1 to produce inducted Lenz current when the pulse width modulation signal generation module 101 is in the non-working stage of the cycle. The Lenz current is stored in the capacitor C1 to previously drive the second fan Fan2. As previously mentioned, the phase lock and delay module 103 generates pulse width modulation signals with the phase difference of 180 degrees. In other words, the pulse width modulation signal generation module 101 outputs a positive wave where the phase difference is between 0 to 180 degrees behind when the first fan Fan1 is in the working stage of the cycle. When the working stage of the first fan Fan1 has expired, the pulse width modulation signal generation module 101 stops working. The inductor of the first Fan1 generates Lenz current and the Lenz current is stored in the first capacitor C1 to drive the second fan Fan2. The phase lock and delay module 103 outputs pulse width modulation signals to the pulse width modulation generation module 101 with a phase difference of between 180 to 360 degrees to make the pulse width modulation signal generation module 101 output a positive wave to drive the second fan Fan2. The fan driving circuit 100 works in cycles, which saves energy and reduces noise.

In one embodiment, the fan driving circuit 100 further includes a third capacitor C3 and a resistor R1. The third capacitor C3 is electrically connected to ground. The resistor R1 is electrically connected to the second capacitor C2. The third capacitor C3 and the resistor R1 collectively form a filter circuit which converts the triangular wave generated by the pulse width modulation signal generation module 101 into square wave, to drive the first fan Fan1 and the second fan Fan2.

In one embodiment, the fan driving circuit 100 is used in desktop computers (DT), servers, emergency power supply systems (EPS) and various switched products (such as LAN switches).

Figure 2:
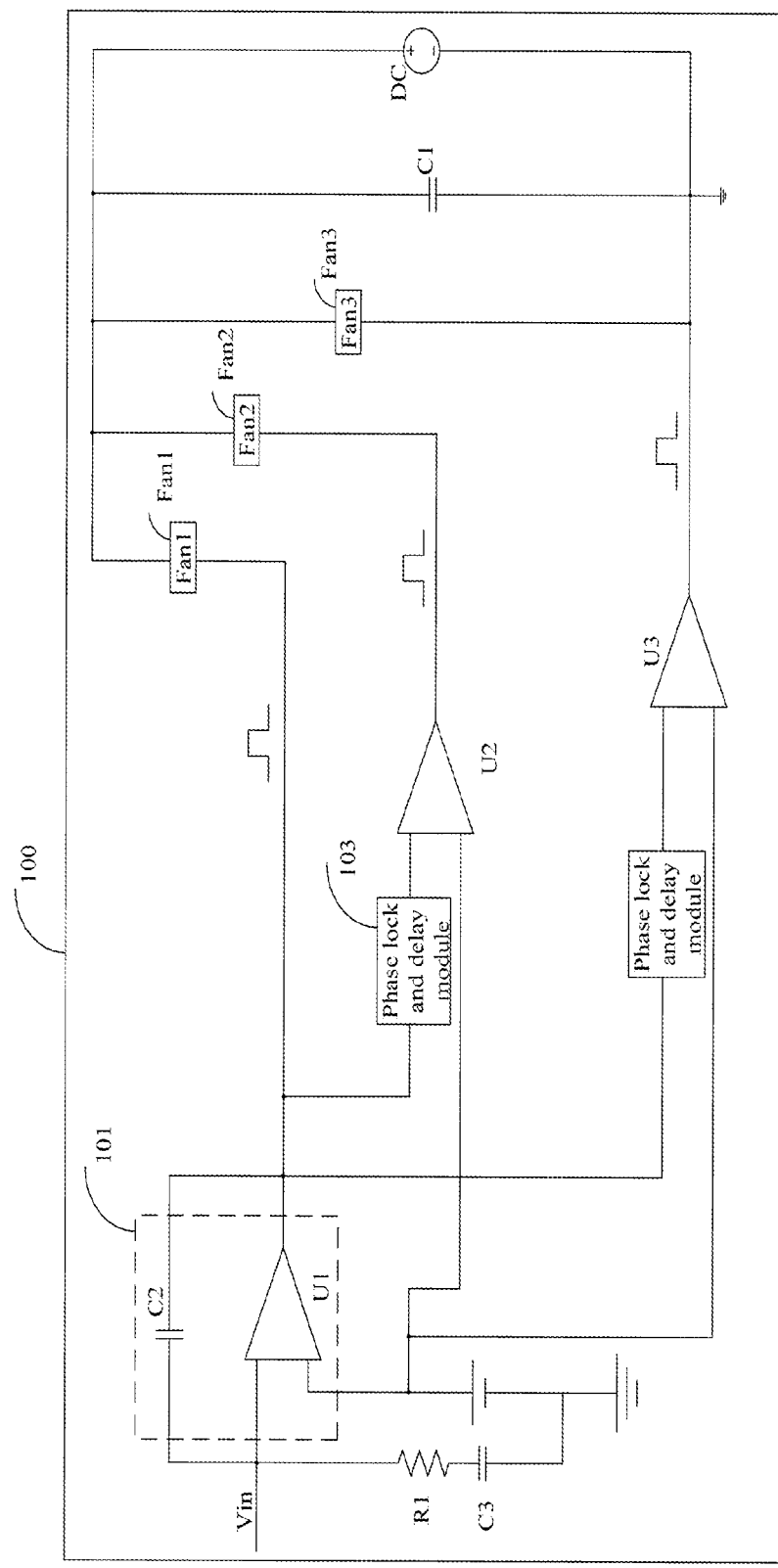
FIG. 2 is a circuit diagram of a fan driving circuit of a second embodiment of the present disclosure.

FIG. 2 is a circuit diagram of a fan driving circuit 100 of a second embodiment.

In this embodiment, compared with the fan driving circuit 100 in FIG. 1, the fan driving circuit 100 further includes a third fan Fan3 and a second phase output comparator U3. The third fan Fan3 is electrically connected to the first fan Fan1 and the second fan Fan2 in parallel and is also electrically connected to the anode of the DC.

In this embodiment, the second phase output comparator U3 includes a first input, a second input and an output. The first input of the second phase output U3 is electrically connected to the phase lock and delay module 103. The second input of the second phase output comparator U3 is electrically connected to pulse width modulation signal generation module 101. The output of the second phase output comparator U3 is electrically connected to the third fan Fan3. The second phase output comparator U3 outputs pulses to the third fan Fan3.

In this embodiment, the phase lock and delay module 103 is electrically connected to the pulse width modulation signal generation module 101. The phase lock and delay module 103 generates pulse width modulation signals with a phase difference of only 120 degrees to the pulse width modulation signal generation module 101.

Figure 3:
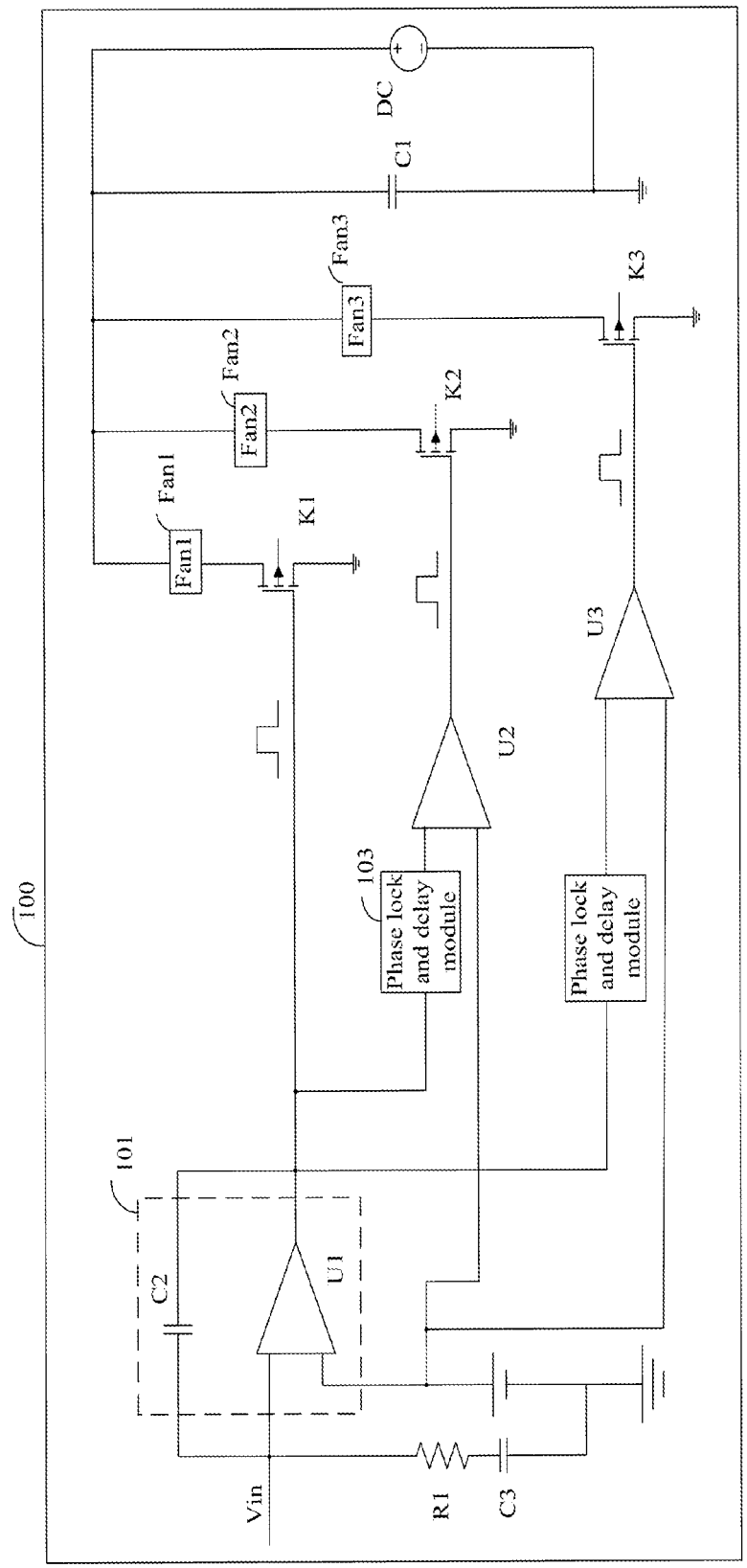
FIG. 3 is a circuit diagram of a fan driving circuit of a third embodiment of the present disclosure.

FIG. 3 is a circuit diagram of a fan driving circuit 100 of a third embodiment of the present disclosure.

In the third embodiment, comparing with the fan driving circuit 100 in FIG. 2, the fan driving circuit 100 further includes a first switch K1, a second switch K2 and a third switch K3. A first electrode of the first switch K1, a first terminal of the second switch K2 and a first terminal of the third switch K3 are respectively electrically connected to the first fan Fan1, the second fan Fan2 and the third fan Fan3. A second terminal of the first switch K1, a second terminal of the second switch K2 and a second terminal of the third switch K3 are grounded. A control of the first switch K1, a control terminal of the second switch K2 and a control terminal of the third switch K3 are respectively electrically connected to the output terminal of the voltage comparator U1, the first phase output comparator U2 and the second phase output comparator U3.

The first switch K1, the second switch K2, and the third switch K3 are N-type metal oxide field effect transistors. The first terminals of the first switch K1, the second switch K2, and the third switch K3 are the drain terminals of the N-type metal oxide field effect transistors. The second terminals of the first switch K1, the second switch K2, and the third switch K3 are source terminals of the N-type metal oxide field effect transistors. The control terminals of the first switch K1, the second switch K2 and the third switch K3 are the gate terminals of the N-type metal oxide field effect transistors.

When the pulse width modulation signal generation module 101 outputs positive phases to make the control electrode of the first switch K1 to be high level, the first switch K1 turns on and starts working.

When the pulse width modulation signal generation module 101 stops working, the control electrode of the first switch K1 outputs low level signals, and the first fan Fan1 is in the "resting" stage. The inductor of the first switch K1 uses the pulse width modulation signal generation module 101 in the non-working stage of the cycle to generate a Lenz current. The Lenz current is stored in the capacitor C1 and is used to drive the second fan Fan2.

After the second fan Fan2 gets to the "resting" stage of the cycle, namely after a phase difference of 120 degrees, the pulse width modulation signal generation module 101 stops working, the control electrode of the second switch K2 outputs low level signals, and the second fan Fan2 stops receiving power. The inductor of the second switch K1 uses the pulse width modulation signal generation module 101 in the non-working stage of the cycle to generate a Lenz current. The Lenz current is stored in the capacitor C1 and is used to previously drive the third fan Fan3.

In other embodiments, the number of the fan driving circuit 100 can be 4 or 5 or more.

Thus, the fan driving circuits 100 of the embodiments use the inductor of the first-working fan to generate Lenz currents to drive the subsequent fans when the pulse width modulation signal generation module 101 is in the first non-working stage of the cycle, which saves energy and reduces noise.

What is claimed is:

1. A fan driving circuit to drive a first fan and a second fan, the first fan and the second fan connected in parallel and both electrically connected to an anode of a direct current (DC) power, the fan driving circuit comprising:

a pulse width modulation signal generation module that generates pulses to drive the first fan and the second fan; a first terminal of the pulse width modulation signal generation module electrically connected to an external power, a second terminal of the pulse width modulation signal generation module electrically connected to the first fan and the second fan;

a phase lock and delay module electrically connected to the pulse width modulation signal generation module, the phase lock and delay module sending pulse width modulation signals to the pulse width modulation signal generation module to make the pulse width modulation signal generation module generate different phase waves;

a first pulse output comparator comprising a first pulse output comparator first input, a first pulse output comparator second input and an first pulse output comparator output, wherein the first pulse output comparator first input is electrically connected to the phase lock and delay module to receive the pulse width modulation signals generated by the pulse width modulation signal generation module, the first pulse output comparator second input receives a reference voltage, and the first pulse output comparator output is electrically connected between the second fan and ground, wherein the first pulse output comparator sends pulses to the second fan according to the pulse width modulation signals; and a first capacitor electrically connected between the anode of the DC power and the ground;

wherein the fan driving circuit uses an inductor of the first fan to generate a Lenz current when the pulse width modulation signal generation module is in a non-working cycle, wherein the Lenz current is stored in the first capacitor and is used to drive the second fan;

wherein the pulse width modulation signal generation module comprises a second capacitor with a first end and a second end, and a voltage comparator with a voltage comparator first input, a voltage comparator second input and an voltage comparator output wherein the voltage comparator first input is electrically connected to the external power, the voltage comparator second input receives a reference voltage, the voltage comparator output is electrically connected to the first fan and the first end of the second capacitor, and the second end of the second capacitor is electrically connected to the external power.

2. The fan driving circuit of claim 1, wherein when an external voltage of the external power is greater than the reference voltage, the voltage comparator output outputs a high level signal to the pulse width modulation signal generation module, and the pulse width modulation signal generation module generates positive wave to make the pulse width modulation signal generation module start working; and when the external voltage of the external power is less than the reference voltage, the voltage comparator output outputs a low level signal to the pulse width modulation signal generation module to make the pulse width modulation signal generation module be in the non-working cycle.

3. The fan driving circuit of claim 1, wherein the phase lock and delay module, electrically connected to the pulse width modulation signal generation module, generates the pulse width modulation signals with a phase difference of 180 degrees to the pulse width modulation signal generation module.

4. The fan driving circuit of claim 2, further comprising a third capacitor and a resistor, wherein the third capacitor is grounded, the resistor is electrically connected to the second capacitor, the third capacitor and the resistor collectively form a filter circuit that converts triangle waves outputted by the pulse width modulation signal generation module to square waves to drive the first fan and the second fan.

5. The fan driving circuit of claim 2, further comprising:
a third fan, connected in parallel with the first fan and the second fan, and electrically connected to the anode of the DC power; and
a second pulse output comparator, that outputs pulse to drive the third fan, comprising a second pulse output comparator first input, a second pulse output comparator second input and a second pulse output comparator output, wherein the second pulse output comparator first input is electrically connected to the phase lock and delay module, the second pulse output comparator second input is electrically connected to the pulse width modulation signal generation module, and the second pulse output comparator output is electrically connected to the third fan.

6. The fan driving circuit of claim 5, wherein the phase lock and delay module electrically connected to the pulse width modulation signal generation module, generates the pulse width modulation signals with a phase difference of 120 degrees to the pulse width modulation signal generation module.

7. The fan driving circuit of claim 5, further comprising a first switch, a second switch and a third switch, wherein a first switch first terminal, a second switch first terminal and a third switch first terminal are respectively connected to the first fan, the second fan and the third fan, a first switch second terminal, a second switch second terminal and a third switch second terminal are all grounded, wherein a first switch control terminal, a second switch control terminal and a third switch control terminal are respectively connected to the voltage comparator output, the first pulse output comparator and the second pulse output comparator;

wherein when the pulse width modulation signal generation module outputs positive waves, the first switch control terminal is a high level, the first switch turns on, and the first fan starts working;

wherein when the pulse width modulation signal generation module stops working, the first switch control terminal is a low level, the first fan stops working, the inductor of the first fan generates the Lenz current when the pulse width modulation signal generation module in the non-working cycle, wherein the Lenz current is stored in the first capacitor and is used to previously drive the second fan.

8. The fan driving circuit of claim 7, wherein the first switch, the second switch and the third switch are N-type metal oxide field effect transistors, wherein the first switch first terminals, the second switch and the third switch are drains of the N-type metal oxide field effect transistors, the first switch second terminals, the second switch and the third switch are the N-type metal oxide field effect transistor sources, the first switch control terminals, the second switch and the third switch are the N-type metal oxide field effect transistors gates.

* * * * *